March 21, 1933. J. W. LEGG 1,902,650
REMOTE CONTROL SYSTEM FOR OSCILLOGRAPHS
Filed Sept. 13, 1928  4 Sheets-Sheet 1

INVENTOR
Joseph W. Legg.
BY
Wesley G. Carr
ATTORNEY

March 21, 1933.  J. W. LEGG  1,902,650
REMOTE CONTROL SYSTEM FOR OSCILLOGRAPHS
Filed Sept. 13, 1928   4 Sheets-Sheet 2

INVENTOR
Joseph W. Legg.
BY
Wesley G. Carr
ATTORNEY

March 21, 1933.   J. W. LEGG   1,902,650
REMOTE CONTROL SYSTEM FOR OSCILLOGRAPHS
Filed Sept. 13, 1928   4 Sheets-Sheet 3

INVENTOR
Joseph W. Legg.
BY
Wesley G. Carr
ATTORNEY

March 21, 1933. J. W. LEGG 1,902,650
REMOTE CONTROL SYSTEM FOR OSCILLOGRAPHS
Filed Sept. 13, 1928 4 Sheets-Sheet 4

INVENTOR
Joseph W. Legg.
BY
Wesley G. Carr
ATTORNEY

Patented Mar. 21, 1933

1,902,650

UNITED STATES PATENT OFFICE

JOSEPH W. LEGG, OF PITTSBURGH, PENNSYLVANIA, ASSIGNOR TO WESTINGHOUSE ELECTRIC & MANUFACTURING COMPANY, A CORPORATION OF PENNSYLVANIA

REMOTE CONTROL SYSTEM FOR OSCILLOGRAPHS

Application filed September 13, 1928. Serial No. 305,858.

This invention relates to systems for locating underground bodies or deposits of different density than that of the surrounding earth, and more particularly to apparatus for operating a part of such system by remote control.

An object of the invention is to provide an apparatus and a method for determining the time required for mechanical vibrations to be transmitted through certain areas of the earth.

A further object is to provide apparatus and a method for comparing the time required for mechanical vibrations to be transmitted through different areas of the earth.

A further object is to provide a system for locating underground bodies or deposits in which all the receiving apparatus may be controlled from the transmitting station.

A further object is to provide receiving apparatus in the above mentioned system which is compact and readily portable.

It has been known for some times that it is possible to locate underground bodies of different density or form than the surrounding earth by detonating an explosive buried in the ground and determining the speed of propagation or the characteristics of the resulting mechanical, or earth, vibrations in different directions from the explosion. This method of locating deposits depends, in part, upon the fact that the speed of propagation of the earth vibration through such deposits differs from the speed through the surrounding earth. By exploding dynamite or the like at different points in the area to be investigated, if there is a deposit within the area, it is possible to locate intersecting paths through which the earth vibrations are transmitted at a speed which indicates its presence. The reflections from a deposit may also be used in locating it. This invention provides an improved system for locating deposits by the general method above described.

In practicing the invention, use is made of a radio transmitter, a quantity of explosive, a plurality of radio receivers and a plurality of seismicrophones. The explosive, usually dynamite, is buried at a point near the radio transmitter and at each radio receiver is located a seismicrophone. In operation, the radio transmitter continuously sends out a timing wave or timing signals in the form of dots or dashes spaced at predetermined intervals. These signals are picked up at the receiving stations and recording apparatus is automatically put into operation. At the instant the dynamite is exploded, a radio signal is transmitted in response thereto. The timing signals and the signal indicating the occurrence of the explosion are recorded on a film at each receiving station. A short time after the signal indicating the occurrence of the explosion has been received, the earth vibrations due to the explosion are picked up by the seismicrophone and these vibrations are likewise recorded on the film. The film, therefore, gives a record of the speed of propagation of the earth vibrations through a certain area and also gives a record of their characteristics. As each receiving station is provided with means to stop the recording apparatus after it has operated for a fixed period, it will be seen that several explosions may be recorded without requiring the presence of operators at the different receiving stations.

Other features and advantages of the invention will appear from the following description in connection with the accompanying drawings, in which.

Figure 1:
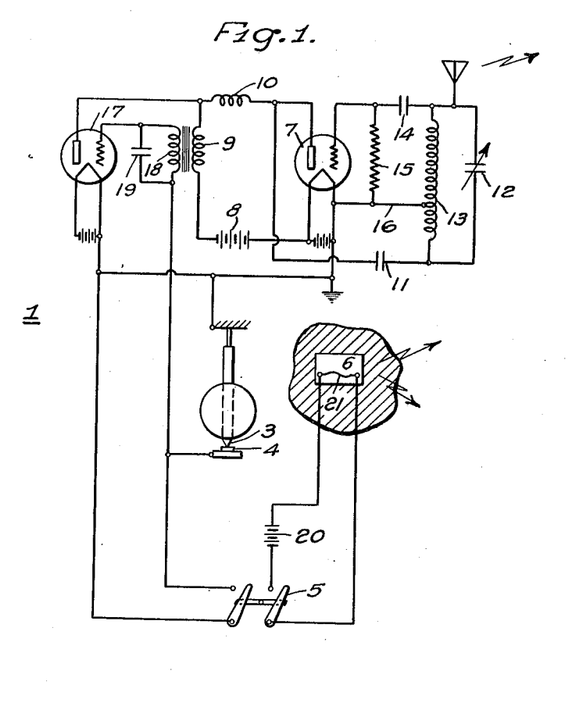
Figure 1 is a diagrammatic view of the general system used in practicing the invention.

Referring to Fig. 1, the system consists of a transmitter 1 and a plurality of receiving stations 2. The transmitter comprises an oscillator circuit for generating a carrier wave and an oscillator circuit, preferably adjusted to oscillate at a constant audio frequency, connected thereto for modulating the carrier wave. The object of modulating the carrier wave at a constant frequency is to obtain greater selectivity. The audio frequency oscillator is rendered operative periodically by means of the grid circuit in which contacts are closed at regular intervals, thereby causing the oscillator to function. In the figure, the grid circuit includes a pendulum 3 and contact is made at regular intervals between the pendulum 3 and the mercury in a cup 4. The audio frequency oscillator is also rendered operative at the instant the switch 5 is closed to explode the dynamite 6. The carrier wave generated may be of any frequency suitable for ordinary radio transmission. The modulating current, preferably of an audio frequency, is assumed to be of the order of 100 cycles per second in the present embodiment.

The period of the pendulum may be any value that will give conveniently spaced timing marks on the film at the receiving station. A convenient adjustment is one that will cause the pendulum to make contact with the mercury once every second.

Figure 2:
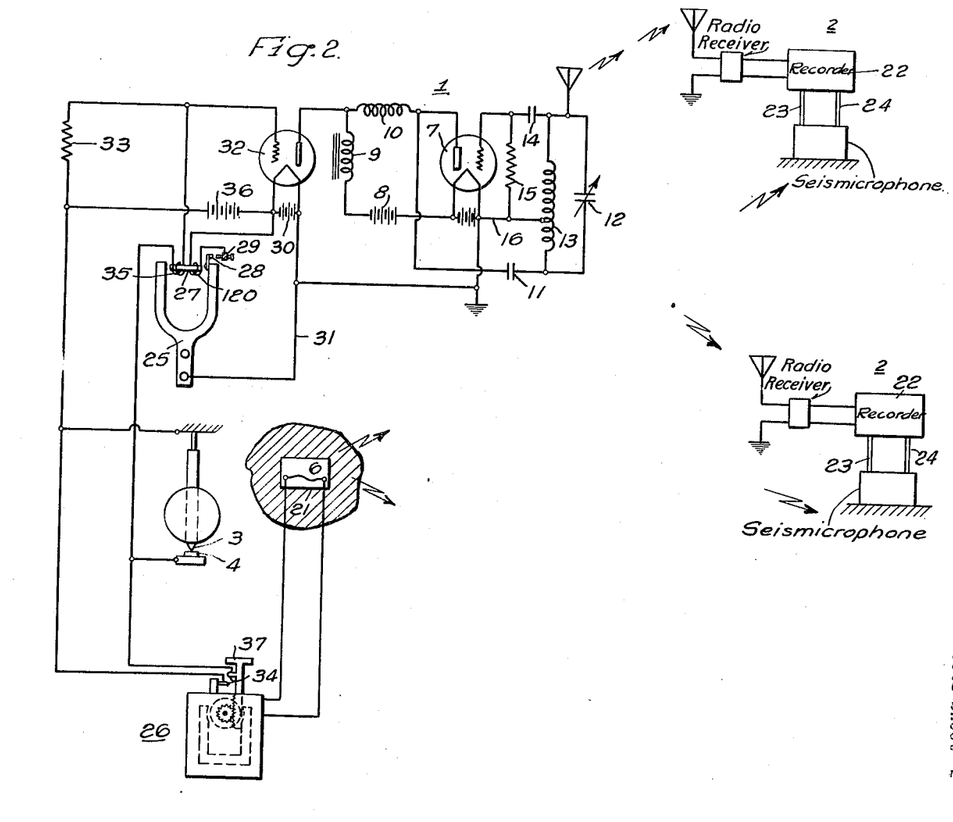
Fig. 2 is a diagrammatic view of a modification of the system shown in Fig. 1.

The transmitter circuit is of the well-known type shown and described in "Principles of Radio Communication", 1st ed., by Morecroft, pp. 664, 665, and 681–683, in which the Heising scheme of modulation is used. Referring to Figs. 1 and 2, the oscillator tube 7 has the proper voltage impressed on the plate electrode thereof by battery 8 through a circuit including an iron-core choke coil 9 and a radio-frequency choke coil 10. The plate is connected, through condenser 11, to an oscillatory circuit which includes a condenser 12 and an inductance 13. The grid electrode of the tube 7 is connected to the oscillatory circuit through condenser 14, and to the filament circuit through the high resistance 15. A conductor 16 connects the filament to inductance coil 13.

In the arrangement shown in Fig. 1, the carrier wave is modulated by means of a circuit which includes a tube 17 having an inductance 18 and a condenser 19 in its grid circuit. The plate and grid circuits are coupled through inductance coils 9 and 18, and the constants of the circuits are so adjusted that tube 17 oscillates at a frequency lower than that of the carrier wave.

In the example of the invention being described, tube 17 oscillates at 100 cycles per second. Tube 17 functions as both an oscillator and a modulator tube. The cup of mercury 4 and the pendulum 3 are connected to inductance coil 18 and the filament of tube 17, respectively, so that the grid circuit is closed each time the pendulum swings through the mercury cup. This causes tube 17 to oscillate for the period that the grid circuit is closed and to modulate the carrier wave generated by tube 7.

A double key, or switch, 5 is so connected so that, when it is closed, it will close the grid circuit and at the same instant, close the circuit through battery 20 and detonator fuse 21. This provides a means for transmitting a radio signal at the instant the dynamite 6 is exploded.

The receiving apparatus employed in conjunction with the systems illustrated in Figs. 1 and 2, may be the same in both systems. Each receiving station has a radio receiver, a seismicrophone of some kind, preferably including a lamp and a photo-electric cell, and remote-control and recording apparatus 22. Electrical connections 23 lead from the photo-electric cell to an amplifier, and connections 24 lead from the lamp to a current supply; both the amplifier and the current supply being included in apparatus 22.

The transmitter shown in Fig. 2 differs from that shown in Fig. 1 in that a tuning fork 25 is used, instead of a tube oscillator, to supply the audio-frequency modulation. It also differs in that a magneto-detonator 26 is used, instead of a battery, to explode the dynamite.

The tuning fork 25 is vibrated by means of a magnetic core 27 provided with an actuating coil 120 and located between the prongs of the tuning fork. One prong of the fork is provided with a contact 28 so located as to make contact with an adjustable contact 29 connected to coil 120. The other end of coil 120 is connected to one terminal of the battery 30. The circuit through coil 120 is completed through the contacts of the tuning fork, the winding of the coil, battery 30, conductor 31, and the tuning fork.

The other coil is connected across the input of the modulator tube 32 and in parallel with the resistance 33. The circuit of this coil is closed whenever the pendulum 3 swings through the cup of mercury 4, or whenever the contacts 34 on the magneto-detonator 26 are closed.

The tuning fork 25 is vibrated continuously by means of the battery 30 which also supplies current to the filament of tube 32. The arrangement is such that the intermittent energization of the winding 120 induces a voltage of constant frequency in coil 35 and the carrier wave is modulated at this frequency whenever a circuit is completed through the pendulum 3 and the cup 4 or through contacts 34.

A battery 36 may be provided to give the grid of tube 32 a negative bias.

The magneto-detonator is of a common type used in detonating explosives. It comprises a magneto which is driven by a rack and pinion when the handle 37 is pushed down. The magneto output terminals are connected to the fuse 21, and the contacts 34 are so located as to impress the modulating frequency on tube 32 the instant the dynamite 6 is exploded.

It is obvious that other transmitter circuits than the specific ones shown may be used. For example, the first modulator tube and the microphone might be omitted from the circuit shown on page 682 of Morecroft's text, referred to above, and the grid circuit of the low-frequency oscillator connected to the pendulum and to the detonating apparatus. If desired, the signals may be transmitted over a conductor instead of by radio. Also, contacts closed periodically by a constantly rotating cam may be substituted for the pendulum and the cup of mercury.

While, in the preferred form, a single transmitter station is used, it is evident that two transmitters may be used, one for transmitting the timing signals and another for transmitting the signal indicating the occurrence of the explosion.

Figure 3:
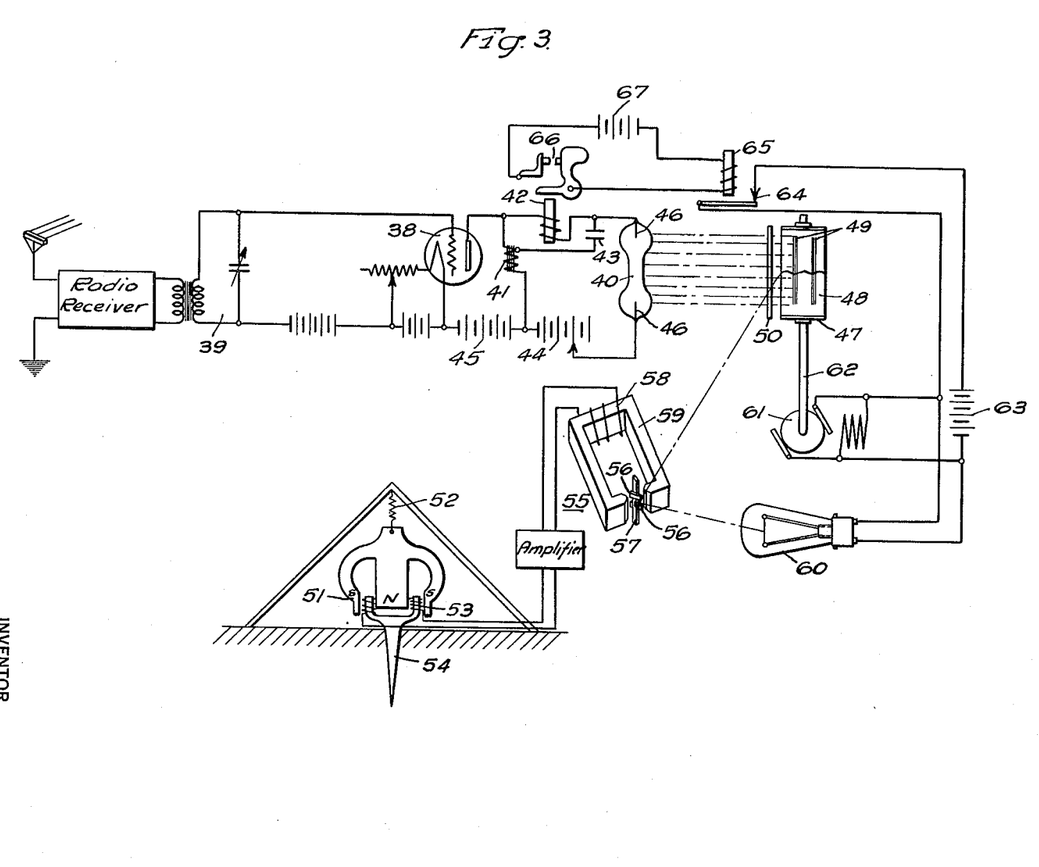
Fig. 3 is a diagram of connections employed in one modification of the receiving apparatus.

In the receiving circuit shown in Fig. 3, an ordinary radio receiver, comprising a tuned circuit and a detector, is used. The output of the receiver is connected to an amplifier tube 38 through a circuit 39 which is tuned to the modulating frequency of 100 cycles per second.

The output of the amplifier is connected to a glow tube 40 by means of an impedance or choke coil 41. Transformer coupling may be substituted for the impedance coupling, if desired. A relay 42, which is preferably shunted by a condenser 43, is included in series with the glow tube. A separate battery 44 may be, and preferably is, provided in order to adjust the glow tube to its most critical condition, but, obviously, the battery may be omitted and the glow tube connected directly to "B" battery 45.

The glow tube 40 is filled with an inert gas, such as neon or argon, at such pressure that the tube glows when a voltage above a certain value is applied to the electrodes 46 but becomes dark again as soon as the voltage is removed.

A rotating drum 47, carrying a film 48, is located in front of the glow tube 40 in such position that flashes of the tube will be recorded on the film in the form of lines 49. When the 100 cycle signal is impressed upon tube 38, glow tube 40 glows every half cycle. This causes each timing line 49 to consist of a plurality of fine lines. A cylindrical lens 50 is preferably located between the glow tube and the rotating film to concentrate the light rays at the point where they strike the film.

The seismicrophone consists of a heavy magnet 51 suspended from supports by means of a spring 52 so that the magnet, because of its inertia, remains stationary even if the earth is vibrating. A coil 53 is located between the poles of the magnet 51 and is supported on a rod 54 driven into the ground. Earth vibrations will cause a voltage to be induced in the coil 53 and be impressed upon an amplifier of conventional design the output of which is connected to a sensitive galvanometer 55.

The galvanometer 55 includes a deflecting element comprising a pair of small permanent magnets 56 and a mirror secured to a metallic ribbon 57. The magnets 56 extend substantially at right angles to the axis of said ribbon and have the like poles thereof disposed on the same side of the ribbon axis. Preferably, the magnets are secured to the ribbon on opposite sides thereof for mechanically counterbalancing the deflecting element.

The deflecting element is mounted in operative position between the poles of an electromagnet comprising an energizing winding 58 disposed on a core 59. The core 59 preferably is of a material incapable of becoming permanently magnetized, such, for example, as a nickel-iron alloy known to the industry as "hypernic".

With the structure described, when the energizing winding 58 is electrically connected to the amplifier, the magnets 56 and the mirror associated therewith will be deflected in accordance with the magnitude, and variation in magnitude, of the current traversing the winding 58.

Obviously, any other sensitive galvanometer may be substituted for the specific one described above.

The lamp 60, which supplies the beam of light for the galvanometer 55, and the motor 61, which is connected to the rotating drum 47 through shaft 62, are both connected to the battery 63 through the contacts 64 of relay 65. The relay contacts are normally open, but the relay is operated to close the contacts by means of a circuit including a battery 67 and the relay 42 which is operative to close its contacts 66 whenever a radio signal causes a discharge to take place through the glow tube 40.

Figures 4, 5:
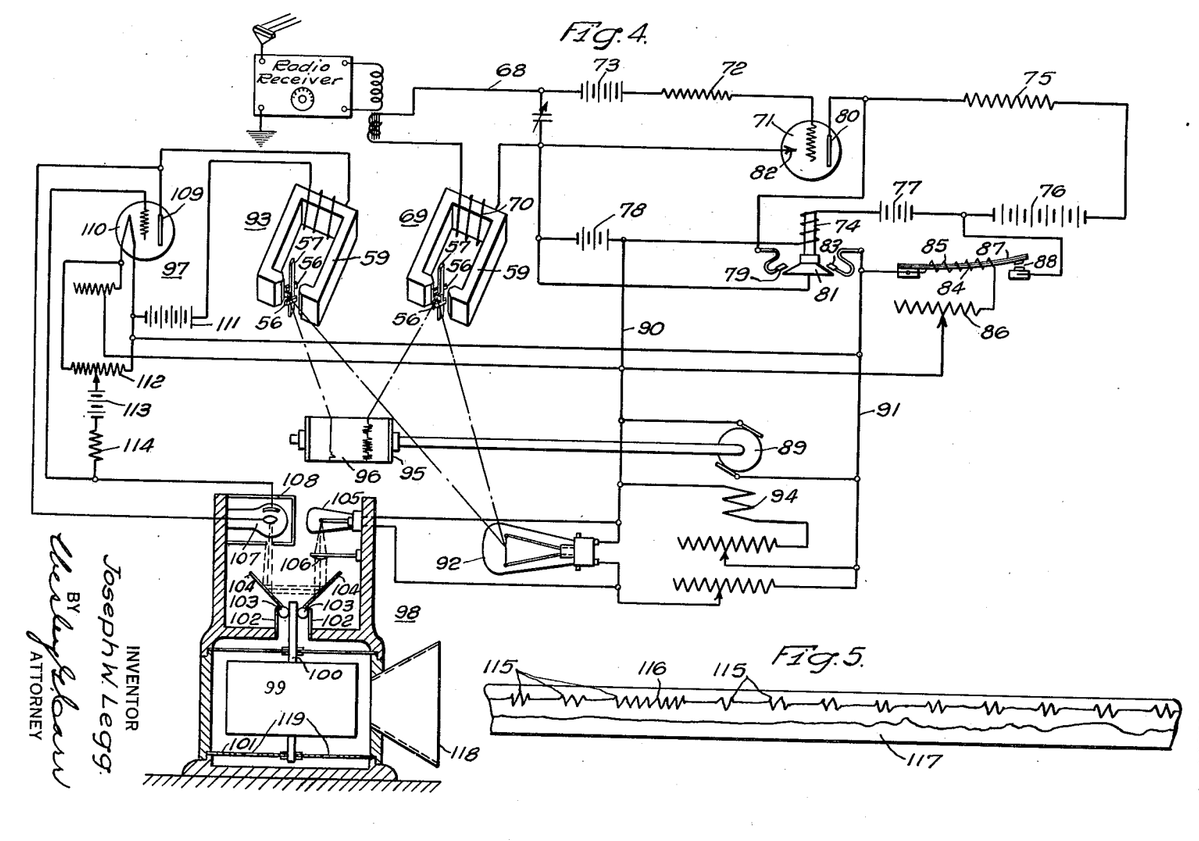
Fig. 4 is a diagrammatic view of the electrical connections and apparatus employed in the preferred form of the receiving apparatus.
Fig. 5 is a plan view of a portion of a film carrying a record of radio impulses and earth vibrations obtained by means of the apparatus shown in Fig. 4.

In the preferred form of the receiving apparatus shown in Fig. 4, as in the system of the preceding figure, a radio receiver of conventional type is used, the output being connected to a circuit 68 tuned to the modulating frequency. The winding 70 of a sensitive galvanometer 69, preferably of the type described in connection with the preceding figure, is connected in the tuned circuit 68. It will be noted that the winding 70 supplies part of the necessary inductance for the tuned circuit 68. A grid glow tube 71 is connected to this tuned circuit through a resistance 72 and a biasing battery 73. The output of the grid glow tube 71 is connected to a relay 74 through a resistance 75, a comparatively high-voltage battery 76 of dry cells, a low-voltage battery 77 of dry cells and a storage battery 78. The grid glow tube 71 is preferably of the type described in detail by Knowles in his copending application 149,290 filed November 19, 1926, and in the Electric Journal for April, 1928, pages 176–178.

The relay 74 is of a type having a winding of high resistance as compared with that of winding 84. Contact 79 of the relay is connected to the cathode 80 of the grid glow tube. Another contact 81 of the relay is connected to one terminal of the storage battery 78 and to the anode 82 of the grid glow tube. The third contact 83 is connected, through the winding 84 of the thermostatic relay 85 and a resistance 86, to the other terminal of the storage battery 78.

The thermostatic relay comprises two strips 87 of dissimilar metals which are provided with a heating winding 84 of only a few ohms resistance. When these strips have been heated for a given period, they bend to close contacts 88. One of these contacts is connected to the positive terminal of the high-voltage battery 76 and the other contact is connected through strips 87 to contact 83.

The following resistance values are given as examples that will be found satisfactory in practice; resistance 72, 5 megoms; resistance 75, 3000 ohms; winding of relay 74, 2000 ohms; winding 84, 3 ohms; and rheostat 86, 6 ohms.

The motor 89, which rotates a film-carrying drum 95, is connected to the storage battery 78 through conductors 90 and 91 and contacts 83 and 81 of the relay 74.

A straight filament lamp 92, which supplies a beam of light for the galvanometers 69 and 93, is connected in parallel with the motor 89 and its field winding 94. The film 96 is attached to the drum 95 and located in front of the galvanometers 69 and 93 in a position to record the galvanometer deflections. Galvanometer 93 is, preferably, of the same type as galvanometer 69 and receives its energy from the output of the photo-electric-cell amplifier 97. Galvanometer 93 records on film 96 the earth vibrations picked up by the seismicrophone 98.

The seismicrophone 98 consists of a heavy weight 99 supported by means of a rod 100 and flexible diaphragms 101. Spring members 102 are attached to the upper frame of the seismicrophone, and rollers 103, carrying mirrors 104, are located between these springs and the rod 100. The frame likewise carries a straight filament lamp 105 connected in parallel with lamp 92, a lens 106 and a photo-electric cell 107 surrounded by a light shield 108 having a slit on the under side through which light, reflected from the mirrors 104, can pass. By so adjusting the position of the lens 106 as to vary the width of the beam of light at the slit, the sensitivity of the seismicrophone may be varied.

A funnel-shape member 118 is supported in an opening in one side of the seismicrophone casing in order that air waves resulting from the explosion at the transmitting station may be picked up and recorded on the film 96. A number of holes 119 are drilled in the lower diaphragm 101 so that the air waves will not act with equal force and in opposite directions against the rod 100 to which the diaphragms are attached. Since the velocity of sound through air is known, the record showing the time of arrival of the air wave may be used in calculating the distance the transmitter is from the receiver instead of determining the distance by surveying.

It is desirable to use the photo-electric rather than the moving-coil type of seismicrophone because the latter type amplifies the high frequency vibrations more than the low ones. Since the earth vibrations, due to the explosion, are of a low frequency, as compared with the various disturbing vibrations, the advantage of the photo-electric type of seismicrophone is obvious.

The photo-electric-cell amplifier 97 may be of any known type and, in the circuit shown, comprises a three-element vacuum tube 109 the filament 110 of which is connected across conductors 90 and 91 to be heated by battery 78. A "B" battery 111 is connected to the plate of tube 109 through the winding of galvanometer 93. A potentiometer 112 may be provided to vary the fixed grid bias provided by the "C" battery 113 which is connected to the grid through a resistance 114. The electrodes of the photo-electric cell are connected to the grid and the plate of the amplifier tube 109, as shown.

The operation of the system shown in Fig. 3, in connection with either of the transmitters shown, will now be described. When it is desired to explore a given area, the explosive is buried at a point relatively near the transmitter, and the transmitter set in operation. The transmitter sends out a timing signal, or dot each time the pendulum 3 makes contact with the cup of mercury 4. These dots are transmitted by the carrier modulated at 100 cycles per second. The carrier is selected at the receiver and demodulated and the signal is further selected by the circuit 39 which is tuned to 100 cycles per second.

Each dot which is transmitted when the pendulum closes the circuit is amplified and impressed on the glow tube 40. As this causes tube 40 to glow each half cycle while a dot is being received, timing lines 49 are recorded on film 48 at regular intervals as soon as the film is put in motion. It will be noted that the pendulum may be omitted from the transmitter circuit and the fine lines which occur at each half cycle used in calculating time intervals. The energy for the glow discharge is furnished by the battery 44, the radio signal merely initiating the discharge. As soon as the discharge takes place, the relay 42 is closed, which, in turn, closes the other relay 65 and the circuit through the motor 61 and the lamp 60. Regularly spaced timing lines are now recorded on the moving film 48.

An instant later, the dynamite 6 is exploded and the radio signal, indicating this fact, is recorded on the drum in the form of an extra, or a wider, line. A very short time later the earth vibrations resulting from the explosion actuate the coil 53 of the seismicrophone.

Since the inertia of the heavy magnet 51 is great, there will be relative movement between the coil 53 and the magnet 51, and a potential will be generated which may be amplified until it will actuate the deflecting system of the galvanometer 55. The movement of the deflecting system, in accordance with the actuation of the seismicrophone, is recorded on the rotating film 48 by means of the beam of light supplied from the lamp 60 reflected from the mirror on ribbon 57.

Either of the relays 42 and 65 may be slow-acting. In that case, with proper adjustment, the timing signals will keep the circuit closed until the transmission of signals is stopped. The recording apparatus will then return to its former inoperative position and be ready to respond to another set of timing signals and record another explosion. If desired, the relay 42 may be of the type which remains closed once the contacts 66 are closed, but, in that case, it would be desirable to have an operator in attendance at the receiving station.

The general operation of the system shown in Fig. 4 is the same as the operation just described. The receiving circuit operates in conjunction with either of the transmitters previously described, and, as previously indicated, several of these receivers would ordinarily be operated simultaneously.

Timing signals sent out from the transmitter are selected at each receiving station by the radio receiver and the audio tuned circuit 68, and impressed on the grid glow tube 71. The first signal received changes the potential of the control electrode of the tube and causes a glow discharge to take place through the tube. Current then flows, through the resistance 75, the batteries 76 and 77, the winding of relay 74 and the battery 78, to anode 82. It will be noted that the radio signal merely initiates the current flow and that battery 76 supplies the energy. The flow of current causes the contacts of the relay 74 to close and connect the storage battery 78 to the motor 89, to the lamps 92 and 105 and to the filament 110 of the vacuum tube 109. At the same time, connection is made from the cathode 80 of the grid glow tube 71 to the anode 82 so as to stop the glow discharge which normally continued in a grid glow tube when connected as shown, and adjusted by means of the grid bias battery 73 for maximum sensitivity. Closing of the relay 74 also completes a holding circuit from battery 76, through battery 77, the winding of relay 74, battery 78, contact 81, contact 79 and resistance 75, to battery 76. Battery 76 now maintains a flow of current through the circuit, and the contacts of relay 74 remain closed until the thermostatic relay 85 closes.

The thermostatic relay is controlled through another circuit which is completed through the contacts 81 and 83, the heating winding 84 of the thermostatic relay, the resistance 86, conductor 90, and the storage battery 78. The length of time that the contacts 88 remain open after relay 74 closes is determined by the amount of resistance 86 in the circuit.

As the film is now in motion and the lamps 92 and 105 and the filament 110 are lighted, the recording circuit is in operative condition.

The dynamite 6 is now exploded and the signal indicating this fact is received and recorded on the rotating film 96 by means of the galvanometer 69. This galvanometer is likewise causing the timing impulses to be recorded on the film. An instant later, the earth vibrations cause the frame of seismicrophone 98 to move relative to the rod 100 carrying the heavy weight 99. This movement causes the rollers 103 to move and tilt the mirrors 104 with respect to each other. The beam of light, being so adjusted that, normally, only one-half of it passes through the slit to the photo-electric cell, is so moved in accordance with the movement of mirrors 104 that a varying amount of light reaches the photo-electric cell. The light variations produce a varying current in the output of the amplifier 97 which is recorded, on the rotating film 96, by means of the galvanometer 93.

The type of record which is obtained by the apparatus shown in Fig. 4 is shown in Fig. 5. The timing signals 115 are first recorded and then an extra or a longer impulse 116 which indicates that the explosion has taken place. An instant later, the earth vibrations 117 arrive. If the pick-up device 118 is used to record the arrival of air waves resulting from the explosion they will be recorded on the film after the earth vibrations have been recorded.

From this record it is possible to calculate the length of time required for the earth vibrations to be transmitted from their source to the receiving station and to study their characteristics.

After the receiving station has been in operation a predetermined length of time, the current through the coil 84 heats the bimetallic strip 87 and causes it to bend, closing the contacts 88 and completing a circuit from the negative terminal of the battery of dry cells 77, through the bimetallic strip 87, and the contacts 83 and 81 of the relay 74, to the negative terminal of the storage battery 78. Since the storage battery 78 and the dry-cell battery 77 are of the same voltage and are connected with their polarities in opposition, a short circuit will be put across the winding of relay 74 and, at the same time, no current will flow through the circuit. This causes the relay 74, which was previously held closed by the battery 76, to open. As a result, the recording circuit assumes its previously inoperative condition and is ready to again be put in condition for recording the results of another explosion. If the winding of relay 74 is given the resistance mentioned in the above example, the battery 77 may be omitted, if desired, since the low voltage battery 78 cannot send enough current through the winding to operate the relay.

Various modifications may be made in my invention without departing from the spirit and scope thereof, and I desire, therefore, that only such limitations shall be placed thereon as are imposed by the prior art and are set forth in the appended claims.

I claim as my invention:

1. A system comprising transmitter means for transmitting a series of signals which occur at predetermined intervals and receiver means for recording them on a receiving surface, said two means being widely separated geographically, means for transmitting mechanical vibrations through the earth and means for recording them on said receiving surface, and means for altering the characteristic of said series in response to the initiation of said mechanical vibrations.

2. A system comprising means for producing earth vibrations, transmitter means for transmitting a series of electrical impulses at least part of which are spaced a predetermined time interval apart, means for modifying said series in response to the initiation of said vibrations, and receiver means for recording said vibrations and said impulses on a common receiving surface, said transmitter means and said receiver means being widely separated geographically.

3. A system comprising means for producing earth vibrations, transmitter means for transmitting a series of electrical impulses spaced a predetermined time interval apart, means for electrically transmitting a signal at the instant said vibrations are produced, and receiver means for recording said vibrations, said impulses and said signal on a common receiving surface, said transmitter means and said receiver means being widely separated geographically.

4. A system comprising means for producing earth vibrations, transmitter means for transmitting a series of electrical impulses spaced a predetermined time interval apart, means for electrically transmitting a signal in response to the initiation of said vibrations, receiver means for recording said vibrations, said impulses and said signal on a common receiving surface, and means responsive to said impulses for putting said recording means into operative condition, said transmitter means and said receiver means being widely separated geographically.

5. A system comprising a radio transmitting station, a plurality of radio receiving stations, means for producing earth vibrations, said transmitting station comprising means for transmitting a series of electric impulses spaced apart by predetermined intervals during the transmission of said vibrations and a recording element at each receiving station, means for putting said recording element in motion in response to transmission of an electrical signal from the vicinity of said transmitting station and means for simultaneously recording said impulses and said vibrations on said recording element.

6. A system comprising a radio transmitting station, a plurality of radio receiving stations, means for producing earth vibrations, said transmitting station comprising means for transmitting a series of electric impulses spaced apart by predetermined intervals during the transmission of said vibrations, and a recording element at each receiving station, means for putting said recording element in motion in response to transmission of an electrical signal from said transmitting station and means for simultaneously recording said impulses and said vibrations on said recording element and means for stopping said recording element after it has been in motion a predetermined time.

7. A system comprising a radio transmitting station, a plurality of radio receiving stations, means located in the vicinity of said transmitting station for producing earth vibrations, said transmitting station comprising means for transmitting a timing wave, means for electrically transmitting a signal in response to the initiation of said earth vibrations, recording apparatus at each receiving station, means for putting said recording apparatus in operative condition in response to transmission of energy from the vicinity of said transmitting station, and means for recording said timing wave, said signal, and said earth vibrations on said recording element.

8. A system comprising a radio transmitting station, a radio receiving station, means located in the vicinity of said transmitting station for producing earth vibrations, a record receiving surface at said receiving station, means including a lamp for making a record on said surface, means for putting said surface in motion and for lighting said lamp in response to a radio signal from said transmitter, means for transmitting from said transmitter and for recording on said surface a radio signal in response to the actuation of said first means, and means for recording said earth vibrations on said surface.

9. A radio system for investigating strata of the earth comprising means for transmitting timing signals by radio, means including a radio receiver for recording said timing signals on a receiving surface, said two means being widely separated geographically, means located near said first means for transmitting mechanical vibrations through said strata and means for recording said vibrations on said receiving surface.

10. A radio system for investigating strata of the earth comprising means for transmitting timing signals by radio, means including a radio receiver for recording said timing signals, said two means being widely separated geographically, means located near said first means for transmitting mechanical vibrations through said strata, and means including said radio receiver for recording both said vibrations and the time at which they were initiated, said last means comprising a grid glow tube, a relay connected in the output circuit of said grid glow tube, and means for extinguishing a discharge through said tube in response to the closing of said relay.

In testimony whereof, I have hereunto subscribed my name this 7th day of September 1928.

JOSEPH W. LEGG.